United States Patent [19]

Umbach et al.

[11] 3,862,204
[45] Jan. 21, 1975

[54] HYDROXYCARBOXYLIC ACID NITRILES AND PROCESS

[75] Inventors: Wilfried Umbach, Langenfeld; Rainer Mehren, Wesel-Lackhausen; Werner Stein, Erkrath-Unterbach, all of Germany

[73] Assignee: Henkel & Cie GmbH, Dusseldorf, Germany

[22] Filed: Oct. 15, 1973

[21] Appl. No.: 406,233

Related U.S. Application Data

[63] Continuation of Ser. No. 175,773, Aug. 27, 1971, abandoned, which is a continuation-in-part of Ser. No. 24,031, March 30, 1970, abandoned.

[30] Foreign Application Priority Data

Apr. 5, 1969 Germany............................ 1917658
Sept. 5, 1970 Germany............................ 2044160

[52] U.S. Cl............. 260/465.6, 260/464, 260/465.4
[51] Int. Cl............................................ C07c 121/02
[58] Field of Search............... 260/465.6, 464, 465.4

[56] References Cited
UNITED STATES PATENTS

| 1,914,326 | 6/1933 | Fick................................ 260/465.6 |
| 2,364,422 | 12/1944 | Brooks........................ 260/465.6 X |
| 2,390,519 | 12/1945 | Davis et al...................... 260/465.6 |
| 2,453,062 | 11/1948 | Carpenter....................... 260/465.6 |
| 3,047,588 | 7/1962 | Van Ess........................... 260/465.6 |

OTHER PUBLICATIONS

Migrdichian, "The Chemistry of Organic Cyanogen Compounds," 1947, pp. 182–183.

*Primary Examiner*—Joseph P. Brust
*Attorney, Agent, or Firm*—Hammond & Littell

[57] ABSTRACT

3-hydroxy-1-carboxylic acid nitriles having more than 5 carbon atoms and a process for producing them, comprising reacting a vicinal epoxide having more than 4 carbon atoms with hydrocyanic acid in the liquid phase at a temperature of from −20° to 120°C in the presence of a compound selected from the group consisting of compounds forming cyanide ions, strong bases and mixtures thereof.

13 Claims, No Drawings

HYDROXYCARBOXYLIC ACID NITRILES AND PROCESS

REFERENCE TO A PRIOR APPLICATION

This application is a continuation of copending application Ser. No. 175,773, filed Aug. 27, 1971, and now abandoned. Application Ser. No. 175,773 is, in turn, a continuation-in-part of copending application Ser. No. 24,031, filed Mar. 30, 1970, and now abandoned.

THE PRIOR ART

The reaction of lower epoxides such as ethylene oxide, propylene oxide or butylene oxide in the gas phase with hydrocyanic acid to give the corresponding β-hydroxycarboxylic acid nitriles is known. The reaction was thoroughly investigated because acrylonitrile had earlier been made by splitting off water from β-hydroxypropionic acid nitrile. Most of the processes proposed for carrying out this reaction were operated in the gas phase.

The reaction of higher epoxides with 5 or more carbon atoms in the liquid phase has only previously been carried out successfully with satisfactory yields when epoxides with tertiary carbon atoms were used as starting substances. In this process, relatively large amount of alkali metal cyanides have to used, from which hydrogen cyanide is evolved together with $CO_2$. Corresponding amounts of salt impurities remain in the crude product.

Summarizing, it may be stated that no process was previously known which, starting from higher epoxides of any optional structure, allowed the production of hydroxycarboxylic acid nitriles in satisfactory yields.

OBJECTS OF THE INVENTION

An object of the invention is to develop a process which makes available in a simple and economic way longchain hydroxycarboxylic acid nitriles by the reaction of the corresponding epoxide with hydrogen cyanide.

Another object of the invention is the obtaining of 3-hydroxy-carboxylic acid nitriles of the formula

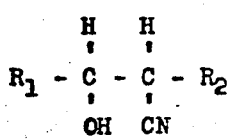

wherein $R_1$ represents an aliphatic residue having from 1 to 22 carbon atoms selected from the group consisting of alkyl, alkylcarbalkoxy, alkyloxyalkyl, hydroxyalkyl and vicinal-hydroxy-cyano-alkyl and $R_2$ represents a member selected from the group consisting of hydrogen and $R_1$, wherein the sum of the carbon atoms in $R_1$ and $R_2$ is an integer from 6 to 22.

A further object of the invention is the development of a process for the production of 3-hydroxy-carboxylic acid nitriles having more than 5 carbon atoms which consists essentially of reacting an organic vicinal epoxide free of olefinic double bonds and ketonic oxygen having more than 4 carbon atoms with hydrocyanic acid at a temperature between −20°C under sufficient pressure to maintain the reactants in the liquid phase, in the presence of from 0.1 percent to 20 percent by weight based on said organic vicinal epoxide, of catalytic compounds selected from the group consisting of compounds forming cyanide ions, strong bases, and mixtures thereof, and recovering said 3-hydroxycarboxylic acid nitrile.

These and other objects of the invention will become more apparent as the description thereof proceeds.

DESCRIPTION OF THE INVENTION

The present invention provides a process for the preparation of higher 3-hydroxy-carboxylic acid nitriles comprising reacting an organic vicinal epoxide having at least 5 carbon atoms, in the liquid phase with hydrocyanic acid, optionally under pressure, at temperatures of from −20°C to 120°C in the presence of a compound forming cyanide ions and/or a strong base.

In a further aspect, the present invention provides hydroxycarboxylic acid nitriles of the formula

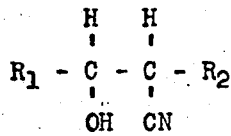

in which $R_1$ represents an aliphatic residue with 1 to 22 carbon atoms, preferably selected from the group consisting of alkyl, alkylcarbalkoxy, alkyloxyalkyl, hydroxyalkyl and vicinal-hydroxy-cyano-alkyl, and $R_2$ represents a hydrogen or $R_1$, while the sum of the carbon atoms in $R_1$ and $R_2$ is an integer from 6 to 22.

The most important compounds forming cyanide ions are the water-soluble salts of hydrocyanic acid which dissociate with strong bases. Examples of these are alkali metal cyanides, especially sodium, potassium and lithium cyanides, and alkaline earth metal cyanides such as calcium cyanide, and cyanides obtainable from other strong metal bases such as, for example, thallous cyanide.

Compounds of hydrocyanic acid with onium bases, for example ammonium cyanide, are also utilizable, as well as heavy cyanides and complex cyano compounds, for example hexacyanoferrate (III), and addition compounds containing cyano groups. These include, for example $AlCl_3.4HCN$ and $FeCl_3.2HCN$.

Such compounds are especially useful in combination with strong bases.

The strong bases used are particularly alkali metal and alkaline earth metal hydroxides, for example sodium, potassium, lithium and calcium hydroxides and thallous hydroxide. Further, onium bases, as for example, quaternary ammonium hydroxides are also used as strong bases.

Particularly advantageous as strong bases are alkali metal alcoholates, enolates and/or phenolates. The alkali metal alcoholates may be derived from monohydric or polyhydric aliphatic, cycloaliphatic and/or aromatic alcohols or enols. The alkali metal phenolates may be derived from mono-or polynuclear phenols. These alcohols may also contain heteroatom groups, particularly ether groups. Examples of these alcohols are alkanols having 1 to 22 carbon atoms such as methanol, ethanol, n-propanol, i-propanol. butanols, octanols, dodecanols, fatty alcohol mixtures, particularly of the chain length range of $C_{12}$ to $C_{18}$, alkanediols having 2 to 6 carbon atoms such as ethylene glycol, alkoxyalkanols having 3 to 22 carbon atoms such as ethylene glycol monomethyl ether, alkanetriols having 3 to 6 carbon atoms such as glycerine, partial alkyl ethers of alkanetriols having 4 to 22 carbon atoms such as the mono and dimethyl ethers of gylcerine, polyoxyethylene glycols having 4 to 12 carbon atoms and their mono lower alkyl ethers such as diethyleneglycol and ethoxy-ethoxyethanol, phenyl-lower-alkanols such as benzyl alcohol, cyclohexanol, alkanones in the enolic form having 4 to 22 carbon atoms such as the enol of acetylacetone, lower alkyl lower alkanoates in the enolic form such as the enol of ethyl acetate, phenol, alkyl phenols having from 7 to 22 carbon atoms such as the cresols, and the naphthols. The alkali metal present in the above alcoholates, enolates and phenolates can be lithium, sodium, potassium, rubidium or cesium. Particularly advantageous are the corresponding lithium compounds.

Both the compounds forming cyanide ions and the strong bases may be used alone or in admixture with one another, and obviously any mixtures between cyanide and strong base can also be used.

The compounds forming cyanide ions and/or strong bases are each suitably used in amounts from 0.1 percent to 10 percent, especially 1 percent to 5 percent by weight, referred to the epoxide used.

When the alkali metal alcoholates are enolates or phenolate are utilized, they can be utilized alone or in a mixture with each other. Particularly advantageous are such mixtures in which a corresponding lithium compound is present.

Mono- or poly-valent, terminal or non-terminal, aliphatic and cycloaliphatic vicinal epoxides may be used as starting substances in the process according to the invention. The epoxides may have straight or branched alkyl chains, may have cyclic groupings in the alkyl chains or may be interrupted or substituted by heteroatoms or hetero-atom groups which do not react with hydrogen cyanide, for example, ether, ester or hydroxyl groups. The epoxides should be free of groups which react with hydrogen cyanide, such as olefinic double bonds and ketonic oxygen. Furthermore, mono- or polyvalent, substituted or unsubstituted, cycloaliphatic epoxides may be used as starting substances.

The epoxides may be used singly or in admixture with one another. Mixtures of epoxides with substances which are inert to hydrocyanic acid may also be used. Examples of such mixtures are epoxidized fatty acid and fatty alcohol mixtures which are derived from naturally occuring unsaturated fats and oils, epoxidized oils or epoxidation products or olefinparaffin mixtures.

Epoxides with epoxy groups of the constitution

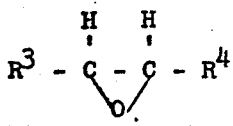

preferably wherein $R_3$ represents a member selected from the group consisting of alkyl, vicinal-epoxy-alkyl, alkyl-carbalkoxy, alkoxyalkyl and hydroxyalkyl, and $R_4$ represents a member selected from the group consisting of hydrogen and $R_3$, and $R_3$ and $R_4$ together represents alkylene, the sum of the carbon atoms in $R_3$ and $R_4$ being from 4 to 51, and especially from 8 to 24 carbon atoms or from 6 to 22 carbon atoms, or corresponding mixtures of homologs, are preferably used as starting substances, for example, n-octene oxide-1,2,2-hexyloctene oxide-1,2 n-dodecene oxide-1,2, n-tetracosene oxide-1,2, n-octadienedioxide-1,2,7,8,n-octene oxide-2,3,9,10-epoxyoctadecanoic acid methyl ester, 2-ethylhexylglycidyl ether, 2,3-epoxyoctanol-4, 9,10-epoxy-octadecanol-1, cyclohexene oxide, cyclododecene oxide, n-octadecene oxide-1,2, and the mixtures of homologs of epoxidized fatty acids and fatty alcohols of natural or synthetic origin.

The process offers particular advantages in regard to the reaction of epoxides with epoxy groups of the consitution

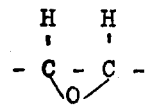

The said epoxides are obtainable from the corresponding unsaturated compounds by processes known from the literature, for example by epoxidation with peracetic acid.

The reaction between epoxide and hydrocyanic acid is preferably carried out at temperatures between 0° and 80°C.

The ratio of epoxide and hydrocyanic acid may vary within wide limits. If all the epoxy groups present in the starting substances are to react, the hydrocyanic acid may be used in amounts which are required for the stoichiometric reaction with the respective epoxide, while a slight excess — about 0.1 to 0.2 mols per mol of monoepoxide — is suitable. Preferably, the reaction is effected with a molar ratio of epoxide and hydrocyanic acid of $1:10x$ to $1:1.2x$ where $x$ represents the number of epoxy groups in the epoxide. In some cases it may also be of interest to aim at an only partial reaction and accordingly to use less than the stoichiometric amounts of hydrocyanic acid. When di- and poly-functional epoxides are used, a part of the epoxy groups can be retained in the molecule by working with less than the stoichiometric amount of hydrocyanic acid.

It is regarded as a particular advantage of the process according to the invention, however, that a relatively large excess of hydrocyanic acid is not necessary for the complete reaction of the epoxy groups present in the starting substance, for example, to obtain high degree of reaction.

The reaction may be generally carried out at normal pressure. In order to shorten the reaction time, however, it may be expedient to work under pressure, even relatively small increases in pressure, such as are attained, for example, in closed systems by heating the reaction mixture to the above given higher reaction temperatures, showing satisfactory effects. The use of higher pressures, such as can be attained, for example, by forcing in inert gases, is therefore generally not necessary.

The reaction can be carried out by methods without use of solvents though, in the case of the reaction of long-chain epoxides by the process of the invention, the use of a solvent may be advantageous. Suitable solvents are especially polar substances, for example lower alkanols such as methanol, ethanol, n- and iso-propanol or mixtures thereof, and ethers such as dioxan or tetrahydrofuran or strongly polar solvents as, for example, dimethyl formamide. The choice of the solvent used is made from the viewpoint of its easy separation from the reaction product. The amount of solvent to be used may vary within wide limits and lie, for example, between 50 percent and 150 percent by weight, referred to the epoxide used.

A particular advantage of the use of alkali metal alcoholates, enolates and phenolates in the process of the invention is that higher molecular weight epoxides can be utilized in solvent-free procedures with excellent yields.

The reaction may be carried out by mixing the epoxide, cyanide and/or strong base, and optionally, solvent, and slowly adding the hydrocyanic acid to the reaction mixture, the temperature of the latter being maintained in the range given above, if necessary by heating or cooling. When operating in a closed system (autoclave), however, the necessary amount of hydrocyanic acid can also be added all at once to the epoxide-catalyst-(and optionally solvent) mixture.

The process of the invention may also be carried out continuously by use of suitable apparatus, for example by use of tubular reactors or ring slot reactors provided with heat exchangers.

After the reaction has ceased, the product may be isolated in the usual way, for example, by working up the crude product by distillation.

A particularly pure product is obtained when the crude product is washed with water or dilute acids before the distillation.

The products are obtained in high to almost quantitative yields and in very pure form. On account of their polyfunctional properties, they are valuable starting substances for numerous syntheses. The higher hydroxycarboxylic acids and unsaturated carboxylic acids obtainable by saponification of the hydroxycarboxylic acid nitriles are of particular interest, as well as the hydroxyamines obtained by hydrogenation of the hydroxycarboxylic acid nitriles.

The advantages obtainable with the invention are especially that higher 3-hydroxy-carboxylic acid nitriles are made available in a simple and economic way.

The possibility of syntheses given by the process according to the invention was not foreseeable, since it is known from the U.S. Pat. No. 2,364,422 that higher epoxides which do not contain tertiary carbon atoms do not react with hydrocyanic acid itself at temperatures of about 100°C. The prejudice created by this against carrying out the reaction in the liquid phase has been removed by the process according to the invention.

The following specific embodiments are illustrative of the invention without limiting the same in any respect.

EXAMPLE 1

46.1 gm (0.25 mol) of n-dodecene oxide-1,2 0.461 gm of potassium cyanide (1 percent by weight) and 0.461 gm of lithium hydroxide (1 percent by weight) were dissolved in 46.1 gm of methanol at room temperature (20°). 7.43 gm (0.27 mol) of hydrocyanic acid were dropped into the reaction mixture over a period of an hour. After the addition of the hydrocyanic acid was finished the reaction mixture was allowed to stand for 23 hours. Then after addition of ether, the catalyst was washed out with dilute sulfuric acid. After drying, the organic phase was worked up by distillation. A fraction boiling at 125°–127°C at 0.2–0.3 mm Hg and having a melting point of 30°–32°C was obtained in a yield of 70 percent of theory, and its analysis data agreed with the values calculated for 3-hydroxytridecylic acid nitrile. The constitution adopted was confirmed by the nuclear magnetic resonance spectrum.

The analysis figures were:

|   | Calculated | Found |
|---|---|---|
| C | 73.88% | 73.25% |
| H | 11.92% | 12.10% |
| O | 7.57% | 7.69% |
| N | 6.63% | 6.19% |
| OH value | 265.4 | 264.8 |

EXAMPLE 2

46.1 gm (0.25 mol) of n-dodeceneoxide-1,2 were dissolved in 46 gm of methanol and 1.38 gm (3 percent by weight) of potassium cyanide, 7.43 gm of hydrocyanic acid (0.27 mol) were added thereto. The mixture was sucked into an evacuated autoclave (250 ml capacity, V4 A-steel, magnetic piston displacement stirring) and the reaction mixture was heated to 80°C. The reaction time including heating up period amounted to 3 hours. The reaction product was first treated with aqueous potassium hydroxide solution, then ether was added and the ethereal solution was separated and washed with 10 percent aqueous hydrochloric acid. The organic phase was dried over sodium sulfate and worked up by distillation.

A product was obtained in 88 percent yield the boiling point of which was 124°–127°C at 0.2 mm Hg and the melting point was 29°–30.5°C. The OH value of the product was 259.8 and agreed with the value of 264.8 calculated for 3-hydroxytridecylic acid nitrile.

EXAMPLE 3

Example 2 was repeated with the exception that a reaction temperature of 60°C was utilized. The yield of 3-hydroxytridecylic acid nitrile (melting point 29°–30.5°C, OH value 258.7) was 86 percent of theory.

EXAMPLE 4

In a procedure carried out similarly to Example 2, 44.8 gm (0.35 mol) of n-octene oxide-1,2, dissolved in 44.8 gm of methanol, were reacted with 10.4 gm (0.385 mol) of hydrocyanic acid at 80°C in the presence of 1.35 gm (3 percent by weight) of potassium cyanide. The total reaction time was 3 hours. The working up was effected as described in Example 2. A product was obtained in 82 percent yield, the boiling point of which was 94°–97°C at 0.2 mm Hg and which had a refractive index $n_D^{20}$ of 1.4452. The analysis values, OH value and osmometrically determined molecular weight (in acetone) agreed well with the values calculated for 3-hydroxypelargonic acid nitrile:

|   | Calculated | Found |
|---|---|---|
| C | 69.64% | 69.68% |
| H | 11.04% | 11.29% |
| N | 9.02% | 9.13% |
| OH value | 361.4 | 355.2 |
| Molecular weight | 155 | 158 |

EXAMPLE 5

In the same way as described in Example 2, 48.3 gm (0.18 mol) of n-octadecene oxide-1,2 dissolved in 48 gm of methanol were reacted with 5.4 gm (0.2 mol) of hydrocyanic acid at 70°C in the presence of 1.45 gm (3 percent by weight) of sodium cyanide. The total reaction time amounted to 3 hours. The working up of the reaction mixture was effected as in Example 2.

A product was obtained in 89 percent yield which had a melting point of 55°–56°C and a refractive index of $n_D^{72} = 1.4410$. The product has an OH value of 187.6 (calculated value 190.2).

EXAMPLE 6

In the method according to Example 2, 49 gm (0.5 mol) of cyclohexene oxide, after addition of 1.47 gm (3 percent by weight) of thallous hydroxide, were reacted with 14.9 gm (0.55 mol)of hydrocyanic acid at temperatures between 80°and 90°C. The total reaction time amounted to 5 hours. The working up was effected as described in Example 2. 2-Cyanocyclohexanol-1 with a boiling point of 146°–150°C at 18 mm Hg and a melting point of 44.5°C was obtained in 83 percent yield.

EXAMPLE 7

Similarly to Example 2, 44.8 gm (0.35 mol) of n-octene oxide-2,3, dissolved in 45 gm of methanol, were reacted with 10.4 gm (0.35 mol) of hydrocyanic acid at 80°C in the presence of 1.35 gm (3 percent by weight) of potassium cyanide. The reaction time amounted to 3 hours. The product worked up according to Example 2 had the following characteristics: boiling point 131°–137°C at 12 mm Hg, refractive index $n_D^{20} = 1.4430$, OH value 357.5 (calculated 361.4).

EXAMPLE 8

In a procedure carried out similarly to Example 1, 46.1 gm (0.25 mol) of n-dodecene oxide-1,2, dissolved in 46 gm of methanol, were reacted with 7.43 gm (0.27 mol) of hydrocyanic acid at 20°C in the presence of 0.9 gm (2 percent by weight) of lithium hydroxide. The total reaction time amounted to 25 hours. The working up was effected as described in Example 1. 3-Hydroxytridecylic acid nitrile, which had a melting point of 30° – 32°C, was obtained in 92 percent yield.

EXAMPLE 9

46.1 gm (0.25 mol) of n-dodecene oxide-1,2 were dissolved in 60 ml methanol and 1.47 gm (3.2 percent by weight, based on the epoxide) of lithium methylate were added to the solution.

7.43 gm(0.27 mol) of hydrocyanic acid were added dropwise at room temperature to the reaction mixture over 1 hour. Subsequently the reaction mixture was kept for 23 hours at room temperature (23° – 26°C). Thereafter the catalyst was, after addition of ether, washed out with water to a neutral reaction. The organic phase was processed after drying by distillation. The yield of 3-hydroxytridecylic acid nitrile, that distilled over at 122° to 125°C/0.2 mm Hg, was 97 percent, based on epoxide charged.

EXAMPLES 10 to 14

In an analogous manner as in Example 9, n-dodecene oxide-1,2 was reacted with hydrocyanic acid in the presence of the alkali metal alcoholates named below, and the yields were determined

| Example | Alkali alcoholate | Yield |
|---|---|---|
| 10 | sodium methylate | 92 |
| 11 | potassium methylate | 90 |
| 12 | lithium methylate | 96 |
| 13 | sodium ethylate | 91 |
| 14 | potassium isopropylate | 90 |

From Examples 9 and 12, the particular suitability of the lithium alcoholates as catalysts for the reaction can be seen.

EXAMPLE 15

To an agitated suspension of 46.7 gm of 98 percent n-dodecene oxide-1,2 and 1.47 gm of lithium methylate(3.2 percent by weight, based on the epoxide), 7.43 gm(0.27 mol) of hydrocyanic acid were added dropwise within 1 hour at room temperature (18° – 21°C). With the addition of hydrocyanic acid a homogenization of the reaction mixture occured. The mixture was held at room temperature for 23 hours. After dissolving of the reaction mixture in ether, it was washed to a neutral reaction with dilute sulfuric acid, dried and processed by distillation. The yield of distilled 3-hydroxytridecylic acid nitrile was 95 percent of theory.

This example shows that also in a procedure free of solvent an almost quantitative yield occurs.

EXAMPLES 16 to 19

In the procedure, according to example 9, the below named epoxides were reacted with hydrocyanic acid in the presence of each time 3 percent by weight of lithium methylate and about 50 percent by weight of methanol, both based on the epoxide.

| Example | Epoxide | Yield of hydroxy-nitrile in % of theory |
|---|---|---|
| 16 | n-octene oxide-1,2 | 96 |
| 17 | n-octadecene oxide-1,2 | 95 |
| 18 | cyclohexene oxide | 95 |
| 19 | 2-hexyl-octene oxide-1,2 | 97 |

EXAMPLE 20

44.8 gm(0.35 mol) of n-octene oxide-2,3, were dissolved in 80 ml of methanol and 2.2 gm(5 percent by weight, based on the epoxide) of lithium methylate were added thereto. The mixture was sucked together with 0.39 mol of hydrocyanic acid, into an evacuated autoclave (250 ml V4 A-steel, magnetic displacement agitator) and the autoclave contents were heated to 80°C. The reaction time, including heating-up time, was 6 hours. The reaction product was dissolved in ether and washed with water to a neutral reaction. The organic phase was dried over sodium sulfate and processed by distillation. An isomeric hydroxy-nitrile mixture was obtained in 50 percent yield whose boiling point was 80° to 84°C/0.05 mm Hg and having a hydroxy number of 359.6(calculated 361.4).

EXAMPLE 21

In the procedure, according to example 20, 46.1 gm(0.25 mol) of n-dodecene oxide-1,2 were reacted, in the presence of 1.4 gm(3 percent by weight, based on the epoxide) of lithium methylate and 80 ml of methanol, with 7.43 gm (0.27 mol) of hydrocyanic acid. The reaction time, including the heating-up time, was 3 hours. The yield of 3-hydroxytridecylic acid nitrile was 97 percent, based on charged epoxide.

Analogous results to the preceding examples were obtained if the reaction of the epoxides with hydrocyanic acid was carried out in the presence each time of 4 percent by weight of lithium ethylene glycolate, sodium phenolate, lithium monomethyl ether of ethylene glycolate and each time 100 percent by weight of methanol, both based on charged epoxide.

The preceding specific embodiments are illustrative of the practice of the invention. It is to be understood, however, that other expedients known to those skilled in the art may be employed without departing from the spirit of the invention or the scope of the appended claims.

We claim:

1. A process for the production of 3-hydroxy-carboxylic acid nitriles having more than 5 carbon atoms which consists essentially of reacting an organic vicinal epoxide having the formula

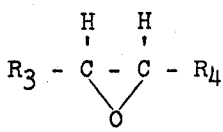

wherein $R_3$ represents a member selected from the group consisting of alkyl, vicinal-epoxy-alkyl, alkylcarbalkoxy, alkoxyalkyl and hydroxyalkyl, and $R_4$ represents a member selected from the group consisting of hydrogen and $R_3$, and $R_3$ and $R_4$ together represent alkylene, the sum of the carbon atoms in $R_3$ and $R_4$ being from 6 to 22 with hydrocyanic acid the ratio of said organic vicinal epoxide and said hydrocyanic acid is between $1:x$ and $1:1.2x$ wherein $x$ represents the number of epoxy groups present in said organic vicinal epoxide, at a temperature between $-20°$ and $120°C$ under sufficient pressure to maintain the reactants in the liquid phase, in the presence of from 0.1 to 20 percent by weight based on said organic vicinal epoxide, of catalytic compounds selected from the group consisting of compounds forming cyanide ions under the reaction conditions, alkali metal hydroxides, alkaline earth metal hydroxides, thallous hydroxide, alkali metal alkanolates having 1 to 22 carbon atoms, alkali metal alkanediolates having 2 to 6 carbon atoms, alkali metal alkoxyalkanolates having 3 to 22 carbon atoms, alkali metal alkanetriolates having 3 to 6 carbon atoms, alkali metal partial alkylethers of alkanetriolates having 4 to 22 carbon atoms, alkali metal polyoxyethylene glycolates having 4 to 12 carbon atoms, alkali metal mono-lower alkyl ethers of polyoxyethylene glycolates, alkali metal phenyl-lower-alkanolates, alkali metal cyclohexanolates, alkali metal enolates of alkanones having 4 to 22 carbon atoms, alkali metal enolates of lower alkyl lower alkanoates, alkali metal phenolate, alkali metal alkylphenolates having from 7 to 22 carbon atoms and alkali metal naphtholates, and mixtures thereof, said reaction occuring under conditions selected from the group consisting of (a) in the presence of a polar organic solvent and (b) in a solvent-free system, and recovering said 3-hydroxy-carboxylic acid nitrile.

2. The process of claim 1 wherein said catalytic compounds are present in an amount of from 1 to 5 percent by weight based on said organic vicinal epoxide.

3. The process of claim 1 wherein said compounds forming cyanide ions is a water-soluble cyanide.

4. The process of claim 1 wherein said temperature is between $0°$ and $80°C$.

5. The process of claim 1 wherein said reacting step is conducted in the presence of a polar organic solvent.

6. The process of claim 5 wherein said polar organic solvent is present is an amount of from 50 to 150 percent by weight, based on said organic vicinal epoxide.

7. The process of claim 1 wherein said alkali metal is lithium.

8. The process of claim 1 wherein said reacting step is conducted in a solvent-free system.

9. The process of claim 1 wherein said catalytic compounds are alkali metal alkanolates having 1 to 22 carbon atoms.

10. The process of claim 1 wherein said catalytic compounds are alkali metal alkanolates of alkanols selected from the group consisting of methanol, ethanol, n-propanol, i-propanol, butanols, octanols, dodecanols and fatty alcohol mixtures having 12 to 18 carbon atoms.

11. The process of claim 1 wherein said catalytic compounds are alkali metal alkanolates of alkanols selected from the group consisting of methanol, ethanol and i-propanol, and said alkali metal is selected from the group consisting of lithium, sodium and potassium.

12. The process of claim 9 wherein said $R_3$ is alkyl, $R_4$ represents a member selected from the group consisting of hydrogen and alkyl, and $R_3$ and $R_4$ together represent alkylene, the sum of the carbon atoms is $R_3$ and $R_4$ being from 6 to 22.

13. A process for the production of 3-hydroxytridecylic acid nitrile which consists essentially of reacting n-dodecene oxide-1,2 with hydrocyanic acid, the ratio of said n-dodecene oxide and said hydrocyanic acid being between 1:1 and 1:1.2, at a temperature between $-20°$ and $120°C$ under sufficient pressure to maintain the reactants in the liquid phase, in the presence of from 0.1 percent to 20 percent by weight based on said n-dodecene oxide-1,2, of the catalytic compound lithium methylate, said reaction occuring in the presence of a polar organic solvent, and recovering said 3-hydroxytridecylic acid nitrile.

* * * * *